US005451717A

United States Patent [19]

Itou

[11] Patent Number: 5,451,717

[45] Date of Patent: Sep. 19, 1995

[54] WIRE SEAL ARRANGEMENT FOR WATERPROOF ELECTRICAL CONNECTORS

[75] Inventor: Hikaru Itou, Yokkaichi, Japan

[73] Assignee: Sumitomo Wiring Systems, Ltd., Mie, Japan

[21] Appl. No.: 148,509

[22] Filed: Nov. 8, 1993

[30] Foreign Application Priority Data

Nov. 27, 1992 [JP] Japan .............................. 4-087677 U

[51] Int. Cl.[6] .............................................. H02G 15/06

[52] U.S. Cl. ................................ 174/77 R; 174/74 R; 174/93; 439/274; 439/275

[58] Field of Search ...................... 174/77 R, 93, 74 R; 439/274, 275, 279, 589

[56] References Cited

U.S. PATENT DOCUMENTS 3,705,950 12/1972 Jirka et al. ......................... 174/77 R
4,079,193 3/1978 Channell ............................ 174/77 R
4,214,802 7/1980 Otani et al. .......................... 439/275
4,268,041 5/1981 Sovish et al. ....................... 174/77 R
4,311,355 1/1982 Plyler et al. ......................... 439/274
4,822,954 4/1989 Rebers et al. ......................... 174/93

*Primary Examiner*—Morris H. Nimmo
*Attorney, Agent, or Firm*—Wenderoth, Lind & Ponack

[57] ABSTRACT

A wire seal formed of an elastic material is fitted to an electrical wire inserted into a housing of a waterproof electrical connector. Specifically, the wire seal is inserted into a cylindrical portion of the connector housing to provide seal. The wire seal includes a seal body having a through-hole through which the electrical wire is inserted, the seal body being fitted in the cylindrical portion of the connector housing, and a cover piece integral with the seal body and extending peripherally of the seal body. The cover piece is in contact with the entire peripheral edge defining an opening of the cylindrical portion of the housing through which the electrical wire is inserted.

16 Claims, 3 Drawing Sheets

WIRE SEAL ARRANGEMENT FOR WATERPROOF ELECTRICAL CONNECTORS

BACKGROUND OF THE INVENTION

1. Field of the Invention

This invention relates to a wire seal for sealing a gap between an electrical wire and a cavity of a waterproof electrical connector.

2. Description of the Prior Art

In an electrical connector, a terminal secured to one end of an electrical wire is inserted in a cavity of a connector housing. A wire seal formed of an elastic material has conventionally been employed for sealing a gap between the cavity of the connector housing and the wire. The prior art has provided the following arrangement for this purpose. A cylindrical wire seal is previously fitted with the end of the wire and crimped thereto. The terminal is then inserted into -the cavity of the connector housing through its one open end and the wire seal is press fitted into the open end of the cavity to close a gap between the wire and the inner peripheral face of the cavity, thereby providing the waterproof seal.

In the above-described arrangement, the wire seal is cylindrical so that the wire is inserted therethrough, and the wire seal has a lip portion formed on its outer peripheral face. The wire seal possesses elasticity at the region thereof where the wire is fitted to the wire seal. The elasticity acts toward the inner periphery of the wire seal. The wire seal further possesses elasticity at the region thereof press-fitted to the open end of the cavity. This elasticity acts toward the outer periphery of the wire seal.

The wire seal is subjected to a hydraulic pressure higher than a normal pressure when a high-pressurized water or liquid is applied to the connector for the cleaning thereof or when an automotive vehicle in which the connector is employed runs in muddy water at a high speed. In such a case, the water sometimes invades the connector housing. The water enters through the gap between the inner peripheral face of the housing cavity and the wire seal rather than between the wire and the wire seal. The reason for this is that the wire seal is fitted with the wire end before the wire seal is press-fitted into the housing cavity, as described above, and the wire seal is allowed to deform to expand outwardly when it is fitted with the wire end. Accordingly, the inner diameter of the cylindrical wire seal can be set at a value sufficiently smaller than that of the wire without lowering an efficiency of the work for fitting the wire seal with the wire, so that a relatively large sealing force can be achieved between the wire and the wire seal. On the other hand, the outer diameter of the wire seal needs to be reduced to its minimum in view of an efficiency of the work for press-fitting it into the housing cavity so that a force required for the press fitting is rendered as small as possible. Consequently, a sufficient sealing force cannot be obtained between the inner peripheral face of the housing cavity and the wire seal.

SUMMARY OF THE INVENTION

Therefore, an object of the present invention is to provide a wire seal which can provide for a sufficient sealing performance for its contact face with the connector housing, at which contact face the sealing performance has conventionally been insufficient.

Another object of the invention is to provide a wire seal which can provide for a sufficient sealing performance both for its contact face with the connector housing and its contact face with the electrical wire.

The present invention provides a wire seal fitted with an electrical wire the wire seal being disposed in a cylindrical portion of a connector housing to thereby provide seal, the wire seal being formed of an elastic material, the wire seal comprising a seal body having a through-hole through which an electrical wire is inserted, the seal body being fitted in the cylindrical portion of the connector housing and a cover piece integral with the seal body extending peripherally thereof, the cover piece being in contact with the whole peripheral edge of defining an opening of the cylindrical portion through which the electrical wire is inserted.

The potential water invasion path between the wire seal and the cylindrical portion of the connector housing is covered by the cover piece extending peripherally of the wire seal. Consequently, a liquid invasion path, which is sometimes formed on the contact face between the wire seal and the housing, can be closed by the cover piece.

In a preferable form, one or a plurality of annular lip portions are formed on an outer peripheral face of the seal body. The sealing performance can be further improved between the contact face of the wire cover and the inner peripheral face of the cylindrical portion of the housing.

In another preferable form, one or a plurality of lip portions are defined by a plurality of annular grooves formed in the inner peripheral face of the seal body, each lip portion having a distal end in contact with the outer peripheral face of the wire. Consequently, the sealing performance of the wire seal can be improved between the contact face of the seal body of wire connector and the wire.

Other objects of the present invention will become obvious upon understanding the illustrative embodiment described in detail hereinbelow, and various advantages not referred to herein will occur to those skilled in the art.

BRIEF DESCRIPTION OF THE DRAWINGS

Embodiments of the invention will be described with reference to the accompanying drawings, in which.

DETAILED DESCRIPTION OF THE PREFERRED EMBODIMENTS

Figure 1:
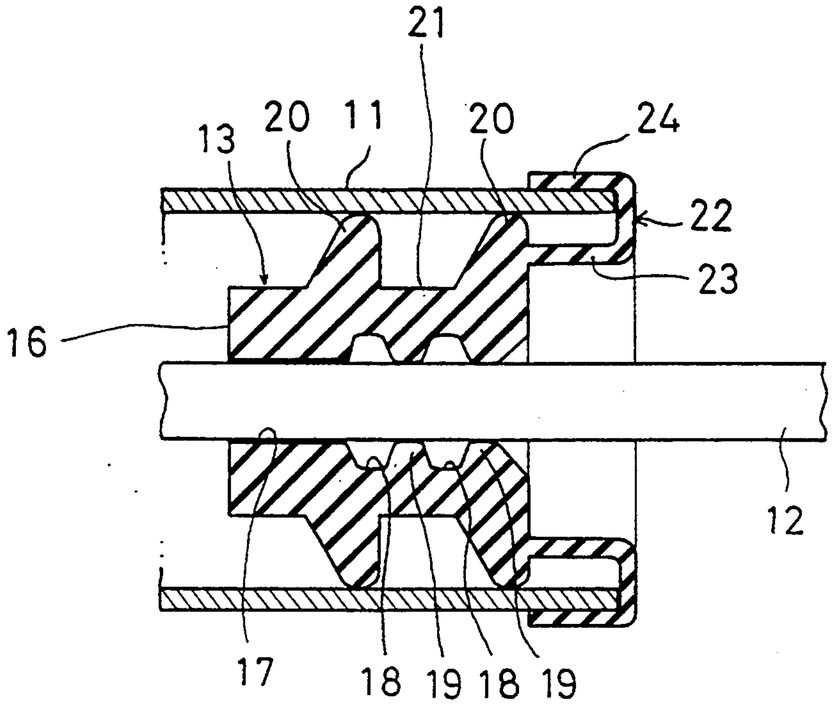
FIG. 1 is an enlarged sectional view of the wire seal of one embodiment in accordance with the present invention, the wire seal being applied to an electrical wire connected to the waterproof electrical connector.
Figure 2:
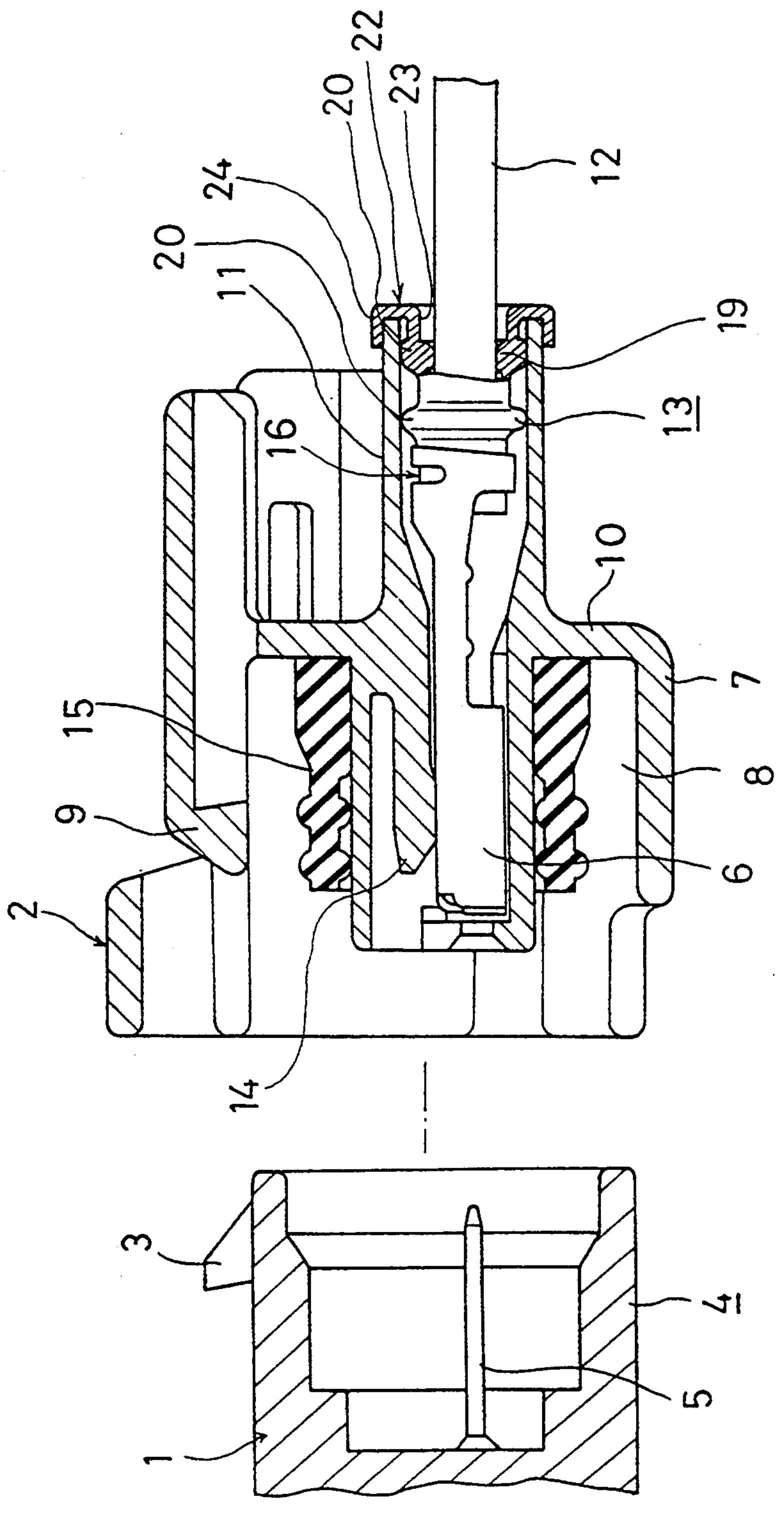
FIG. 2 is a sectional view of male and female connectors.
Figure 3:
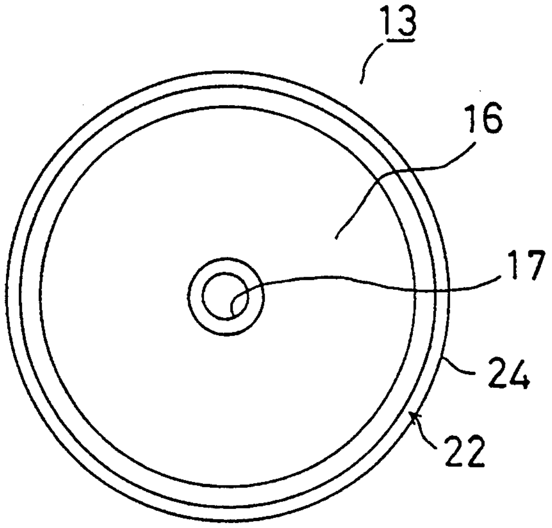
FIG. 3 is a front view of the wire seal.

An embodiment of the invention will now be described with reference to the accompanying drawings. Referring to FIG. 1 and FIG. 2, there is shown a part of a male connector 1 and a female connector 2 constituting a waterproof electrical connector as well known in the art. The male connector 1 includes a cylindrical connection portion 4 opposite the female connector 2. A lock claw 3 is integrally formed on the outer peripheral face of the connection portion 4 near its distal end for the purpose of locking the female connector 2 when the male connector is mated with it. A male terminal 5 projects in the cavity of the connection portion 4 so that the male terminal 5 is inserted into a female terminal 6 when the male connector 1 is mated with the female connector 2.

A housing 7 of the female connector 2 includes a fitting cavity 8 into which the male connector 1 is fitted. The female connector 2 has a claw 9 which is engaged with and disengaged from the lock claw 3 of the female connector 2. The claw 9 faces the fitting cavity 8 for elastic deformation upwardly as viewed in FIG. 2. The housing 7 also has a partition wall 10 formed therein. A cylindrical portion 11 of the housing 7 extends from the partition wall 10 axially both forward and rearward. The female terminal and a wire seal 13, which will be described later, are attached to an end of a wire 12. As shown in FIG. 2, an end of the female terminal 6 is connected to the wire seal 13. In this state, the wire 12 is inserted into the female connector 2 through the right- hand open end thereof as viewed in FIG. 2 until the distal end of the female terminal 6 reaches the distal end of the side of the cylindrical portion 11 opposite the male connector 1. A claw 14 projects from the partition wall 10 to the interior at this side of the cylindrical portion 11 of the housing 7. The claw. 14 is engaged with the female terminal 6 to prevent the the terminal from falling out of the cylindrical portion 11. A connector seal 15 formed of rubber is fitted to the outer periphery of the cylindrical portion 11 for sealing a gap between the female and male connectors.

The wire seal 13 comprises a seal body 16 formed of a generally cylindrical rubber member. The seal body 16 has a central wire insertion through-hole 17 through which the wire 12 is inserted. The diameter of the through-hole 17 is so set as to be sufficiently smaller than the outer diameter of the wire 12 such that a suitable clamping force is applied to the wire 12. Two annular grooves 18 each preventing water invasion are formed in the inner periphery of the wire seal 13 at the side of its open end through which the wire 12 is inserted, whereby two inner peripheral lip portions 19 are provided.

Two annular outer peripheral lip portions 20 are integrally formed to extend around the whole outer periphery of the seal body 16 such that a suitable pressing force is applied to the inner peripheral wall of the cylindrical portion 11.

A groove 21 is provided between the outer peripheral lip portions 20 for the purpose of preventing water invasion. The contact pressure of each outer peripheral lip portion 20 is limited to its required minimum in consideration of the work for inserting the terminal 6 and the wire 12 into the cylindrical portion 11. Accordingly, an amount of deformation of each inner peripheral lip portion 19 is larger than that of each outer peripheral lip portion 20, so that a large sealing force can be achieved between the wire 12 and the seal body 16 as compared with the outer peripheral lip portion 20 and the inner peripheral wall of the cylindrical portion 11, as described in the description of the prior art.

The seal 13 has a cover piece 22 integrally formed on one end face of the seal body 16 (the right-hand end face in FIG. 1). The cover piece 22 covers portions of the seal body 16 and the cylindrical portion 11 in contact with each other. The cover piece 22 includes a cylindrical portion 23 rising from the end face of the seal body 16 and having a diameter slightly smaller than the inner diameter of the cylindrical portion 11 of the housing 7. The cover piece 22 further includes a generally U-shaped folded portion 24 contiguous to the cylindrical portion 23. The U-shaped folded portion 24 is folded to be engaged with an opening edge of the cylindrical portion 11 of the connector housing 7 and is in close contact with an outer peripheral face of the cylindrical portion 11.

The cover piece 22 covers the water entry path via the contact faces of the wire seal 13 and the housing cylindrical portion 11, which path has been a drawback in the prior art. High-pressurized water from the end side of the cylindrical portion 11 collides with the connector when a high-pressurized water or liquid is applied to the connector for the cleaning thereof or when an automotive vehicle in which the connector is employed runs in muddy water at a high speed. However, the water can be prevented by the cover piece 22 from entering the interior of the connector housing 11 through the contact face of the wire seal 13 and the inner peripheral face of the housing cylindrical portion 11. Furthermore, if the water from the opposite direction collides with the connector, the water would be considered to enter the connector housing 7 through the contact faces of the folded portion 24 of the cover piece 22 and the outer peripheral face of the cylindrical portion 11. However, since the distance between the end of the folded portion 24 and the outer peripheral lip portion 20 is sufficiently long, the contact faces of the lip portion 20 and the inner peripheral face of the housing cylindrical portion 11 are not subjected to the high hydraulic pressure, which prevents invasion of water through the contact faces. In the embodiment, particularly, the U-shaped folded portion 24 of the cover piece 22 is closely adhered to an outer peripheral face of the cylindrical portion 11. The folded portion 24 itself provides a sealing function when that part of the cylindrical portion 11 is subjected to the hydraulic pressure, thereby improving sealing performance.

Figure 4:
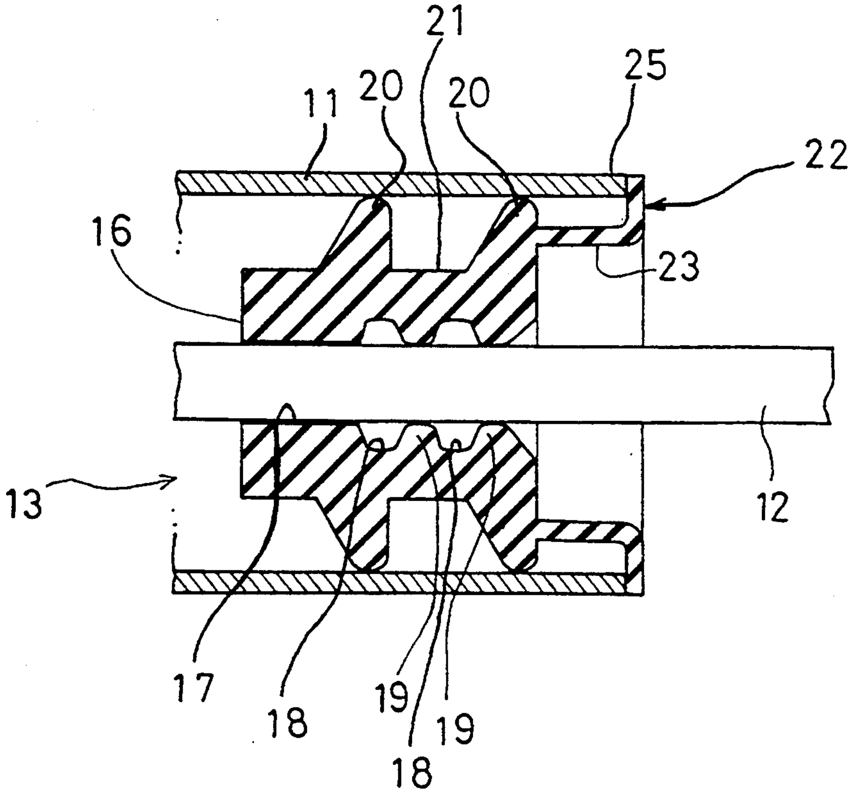
FIG. 4 is an enlarged sectional view of the wire seal of another embodiment.

The folded portion 24 of the cover piece 22 need not be formed by folding the end of the cover piece 22 into the U-shape. For example, FIG. 4 illustrates a modified form in which the distal end of the cylindrical rising portion 23 of the cover piece 22 is in contact with the opening edge 25 of the cylindrical portion 11 of the housing 7.

The present invention is applicable to various types of waterproof electrical connectors and should not be limited to the connector of the type described above. Although the folded portion 24 is merely in contact with the housing cylindrical portion 11 in the foregoing embodiment, it may be formed to have such a diameter that it is press fitted to the cylindrical portion 11 so that it achieves the sealing performance.

The foregoing disclosure and drawings are merely illustrative of the principles of the present invention and are not to be interpreted in a limiting sense. The only limitation is to be determined from the scope of the appended claims.

I claim:

1. An assembly for use in an electrical connector, said assembly comprising the combination of a connector, an electrical wire fixed to the connector, and a wire seal, said connector comprising a housing including a cylindrical portion having an inner peripheral surface and axially opposite peripheral edges defining open ends of the cylindrical portion, respectively, said wire extending out of the cylindrical portion of said housing through one of said opposite ends thereof, and said wire seal providing a seal between said wire and the inner peripheral surface of the cylindrical portion of said housing, said wire seal comprising a seal body of an elastic material having opposite end surfaces, a through-hole extending between and open at said opposite end surfaces, and an elastic cover extending unitarily from one of said opposite end surfaces, said wire extending into said seal body at said one of said opposite end surfaces, said wire extending through said through hole, and said wire extending out of said seal body at the other of said opposite end surfaces, and said cover having a first portion extending peripherally of said seal body and covering the entirety of the peripheral edge of the cylindrical portion of the connector housing that defines said one of said opposite ends of said cylindrical portion.

2. The assembly as claimed in claim 1, wherein said seal body has at least one lip defined by a plurality of annular grooves in an inner peripheral surface of the seal body defining said through-hole, each said at least one lip having a distal end contacting the outer peripheral surface of said wire.

3. The assembly as claimed in claim 1, wherein said cover also has an end portion extending from said first portion over part of the outer peripheral surface of the cylindrical portion of said connector housing and contacting the same.

4. The assembly as claimed in claim 2, wherein said cover also has an end portion extending from said first portion over part of the outer peripheral surface of the cylindrical portion of said connector housing and contacting the same.

5. The assembly as claimed in claim 1, and further comprising a metal terminal having an end connected to said seal body.

6. The assembly as claimed in claim 2, and further comprising a metal terminal having an end connected to said seal body.

7. The assembly as claimed in claim 3, and further comprising a metal terminal having an end connected to said seal body.

8. The assembly as claimed in claim 4, and further comprising a metal terminal having an end connected to said seal body.

9. An assembly for use in an electrical connector, said assembly comprising the combination of a connector, an electrical wire fixed to the connector, and a wire seal, said connector comprising a housing including a cylindrical portion having an inner peripheral surface and axially opposite peripheral edges defining open ends of the cylindrical portion, respectively, said wire extending out of the cylindrical portion of said housing through one of said opposite ends thereof, and said wire seal providing a seal between said wire and the inner peripheral surface of the cylindrical portion of said housing, said wire seal comprising a seal body of an elastic material having opposite end surfaces, a through-hole extending between and open at said opposite end surfaces, at least one outer peripheral annular lip, and an elastic cover extending unitarily from one of said opposite end surfaces, said wire extending into said seal body at said one of said opposite end surfaces, said wire extending through said through-hole, and said wire extending out of said seal body at the other of said opposite end surfaces, each said at least one outer peripheral annular lip contacting the inner peripheral surface of the cylindrical portion of said connector housing, and said cover having a first portion extending peripheral of said seal body and covering the entirety of the peripheral edge of the cylindrical portion of the connector housing that defines said one of said opposite ends of said cylindrical portion.

10. An assembly as claimed in claim 9, wherein said seal body has at least one lip defined by a plurality of annular grooves in an inner peripheral surface of the seal body defining said through-hole, each said at least one lip having a distal end contacting the outer peripheral surface of said wire.

11. The assembly as claimed in claim 9, wherein said cover also has an end portion extending from said first portion over part of the outer peripheral surface of the cylindrical portion of said connector housing and contacting the same.

12. The assembly as claimed in claim 10, wherein said cover also has an end portion extending from said first portion over part of the outer peripheral surface of the cylindrical portion of said connector housing and contacting the same.

13. The assembly as claimed in claim 9, and further comprising a metal terminal having an end connected to said seal body.

14. The assembly as claimed in claim 10, and further comprising a metal terminal having an end connected to said seal body.

15. The assembly as claimed in claim 11, and further comprising a metal terminal having an end connected to said seal body.

16. The assembly as claimed in claim 12, and further comprising a metal terminal having an end connected to said seal body.

* * * * *